June 5, 1962 K. RUPP 3,037,569
MAGNETIC RECORDING AND REPRODUCING APPARATUS
Filed May 12, 1959
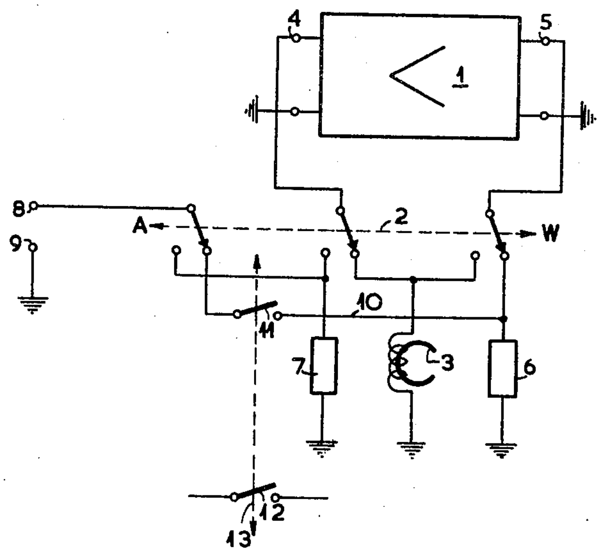
INVENTOR
KARL RUPP
BY Frank R. Jifari
AGENT

United States Patent Office 3,037,569
Patented June 5, 1962

3,037,569
MAGNETIC RECORDING AND REPRODUCING APPARATUS

Karl Rupp, Vienna, Austria, assignor to North American Philips Company, Inc., New York, N.Y., a corporation of Delaware Filed May 12, 1959, Ser. No. 812,642
Claims priority, application Austria May 19, 1958
2 Claims. (Cl. 179—100.11)

The invention relates to a magnetic recording and reproducing apparatus with connecting elements (sockets or the like) to connect this apparatus to the diode terminals of a radio set.

In order to avoid, during recording of radio transmissions, that the frequency characteristic of the low-frequency amplifier of the radio set is transferred to the magnetic recording, the control of the recording amplifier is obtained by using directly the low-frequency voltage produced at the demodulator (diode). This voltage may be obtained from the diode terminals of the radio set. If such a magnetic record is to be produced with the tone corrections usually employed in radio reproduction, it is the most simple method to supply the low-frequency voltage furnished by the reproduction amplifier of the apparatus with frequency linearity again to the diode terminals, whilst the high-frequency portion of the radio set is switched off.

The measure to be taken with the magnetic apparatus consists solely in that the arrangement is such that the pair of sockets concerned, when switching over the apparatus to recording or reproduction, are connected, simultaneously with the other switching operations, to the place concerned, i.e. the input or the output of the amplifiers. However, this measure does not yet ensure that the two apparatus do not act one upon the other during operation.

This mutual reaction is completely obviated by the present invention. In accordance with the invention the conductor between the output of the reproduction amplifier and the associated connecting element (accessible from without) includes a switch, which is coupled with the switch for switching on the tape for recording or reproduction so that the said switch is closed only when the tape is moving.

As a matter of course, it is desired that the link between the radio set and the magnetic apparatus should be realized by a minimum number of conductors and, in particular, the connection of the two devices to each other may not produce mutual interferences. It is common practice to provide the magnetic apparatus with a single connecting element accessible from without (the same pair of sockets) which in one case serves as the output terminal for the reproduction amplifier and in the other case as the input terminal for the recording amplifier, so that since the voltages furnished by or taken by the magnetic apparatus are fed to or obtained from respectively the same place in the radio set, i.e. the diode terminals a single twin conductor is sufficient for connecting the two devices. Owing to the reduction of the required connecting conductors to two, the risk of a mutual reaction is highly increased. Nevertheless, the measure according to the invention obviates, also in this case, the effect or mutual reaction, whilst it is particularly advantageous to provide in a conventional manner a single connecting element, which is connected, in accordance with the chosen operational position of the magnetic apparatus, to the output of the reproduction amplifier or to the input of the recording amplifier.

The mutual reaction, when connecting the magnetic apparatus to the radio set, is due to the required parallel connection of the respective input and output impedances. The input impedance of the recording amplifier may be increased to an extent such that its parallel connection to the likewise high-impedance diode connection does not produce interferences. The recording amplifier of the magnetic apparatus may therefore be permanently connected to the diode terminals, whether the magnetic apparatus is switched on for recording or not during radio listening. However, it is not possible to provide such a high impedance output of the reproduction amplifier that its connection to the demodulator of the radio set will not involve a voltage decrease. As far as the magnetic apparatus is, in fact, used for reproduction via the radio set, a low output impedance of the reproduction amplifier has no disturbing effect, since it is then only a load for the input of the low-frequency amplifier.

The high-frequency part of the radio receiver must simply switched off during reproduction by the magnetic apparatus. However, if it is desired to listen the radio transmission, whilst the magnetic apparatus switched to reproduction remains connected, the voltage furnished by the demodulator part of the radio receiver is suppressed by switching on the output impedance of the reproduction amplifier and, in order to have the possibility of listening to the radio, either the radio receiver and the magnetic apparatus have to be separated or the magnetic apparatus must be switched over, for example to recording. The construction of the magnetic apparatus according to the invention such that this switching-over is not required, so that the difficulties involved therein are avoided. If the magnetic apparatus is, in fact, to be employed for reproduction, the tape has to move. It suffices therefore for the output of the reproduction amplifier to be connected only for the period concerned to the diode terminals of the radio set. If the magnetic apparatus is switched on to recording, an existing connection with the radio set does not cause interferences in view of the high input resistance of the magnetic apparatus, so that the said connection can be maintained whether the tape moves or not. This permanent connection is even quite desirable, since the adjustment of the desired signal level must be possible whilst the tape stands still, in order to avoid waste of tape length.

The invention will now be described more fully with reference to the drawing.

The recording and the reproduction are obtained by means of the same amplifier, which is designated by 1. The usually necessary change-over of the elements to obviate certain distortions of this amplifier are not shown since they are of no importance for the present invention. Therefore, only three switching contacts of the recording-reproducing switch are shown. In accordance with the desired operational condition, the combined recording-reproducing head 3 is connected either by a change-over of the switch 2 into the position W, to the input 4 or by a change-over into the position A, to the output 5 of the amplifier. At the same time the output 5 or the input 4 respectively of the amplifier is connected to earth across the impedances 6 or 7 respectively. The pair of sockets 8, 9 serves for connecting the magnetic apparatus to the diode terminals of the radio set. If the amplifier is adjusted to recording (position A of the switch 2), the socket 8 is connected directly to the input 4 of the recording amplifier 1, irrespective of the fact whether the magnetic apparatus is switched on or not. Since the impedance 7 may be very high-resistant, its connection in the circuit does not cause interferences in the radio reception. The conductor 10, which in the position W of the switch 2, connects the output 5 of the reproducing amplifier to the socket 8, includes a switch 11. This switch is coupled with the switch 12, which upon movement in the direction 13 switches on the tape with the speeds required for recording and reproducing so that it is closed only when the tape is moving. The connection of the socket 8 with the output 5 of the reproducing amplifier is therefore established only during the moving of the tape, i.e. when the reproduction really takes place via the radio set. The impedance 6, which cannot have an arbitrary high-resistant value, does therefore never load the demodulation portion of the radio receiver, since it is only operative, when the radio is listened to, which cannot take place simultaneously with reproduction via the magnetic apparatus. The manner in which the switch 12 causes the switching on of the tape is not shown. The connection of the switch 11 to the switch 12 may be established in a very simple manner, both in the case of mechanical and electrical control.

The invention is not restricted to apparatus in which the same pair of sockets serves as input and output of the magnetic apparatus. The said problem comes up always when the reproducing amplifier of the magnetic apparatus is connected to diode terminals.

What is claimed is:

1. Apparatus for magnetically recording a signal derived from the detector of a signal receiver and for magnetically reproducing a signal through stages of said receiver subsequent to said detector, comprising single input terminal means for making electrical connection to said detector and said stages, a magnetic recording and reproducing device, first switch means for selectively connecting said device in recording or reproducing condition, respectively, to said input terminal means, second switch means having an actuating position for actuating tape driving means for said magnetic recording and reproducing device, and third switch means coupled to said second switch means for disconnecting said magnetic device from said input terminals when said first switch means is in the playback position and said second switch means is not in said actuating position.

2. Apparatus for magnetically recording a signal derived from the diode detector of a signal receiver and for magnetically reproducing a signal through stages of said receiver subsequent to said diode detector, comprising single input terminal means for making electrical connection to said detector and said stages, a magnetic recording and reproducing device, signal amplifying means, first switch means for selectively connecting said device in recording or reproducing condition, respectively, to said input terminal means through said signal amplifying means, second switch means having an actuating position for actuating tape driving means for said magnetic recording and reproducing device, and third switch means coupled to said second switch means for disconnecting the output of said signal amplifying means from said input terminals when said first switch means is in the playback position and said second switch means is not in said actuating position.

References Cited in the file of this patent

UNITED STATES PATENTS

| | | |
|---|---|---|
| 2,557,245 | Zillger | June 19, 1951 |
| 2,572,157 | Kay | Oct. 23, 1951 |
| 2,808,567 | Baumgartner | Oct. 1, 1957 |